United States Patent
Shields (10) Patent No.: US 8,403,361 B2
(45) Date of Patent: Mar. 26, 2013

(54) ACTIVATION SYSTEMS FOR INFLATABLE PERSONAL RESTRAINT SYSTEMS

(75) Inventor: Ronald A. Shields, Mesa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 13/227,382

(22) Filed: Sep. 7, 2011

(65) Prior Publication Data

US 2012/0256403 A1  Oct. 11, 2012

Related U.S. Application Data (63) Continuation-in-part of application No. 13/174,659, filed on Jun. 30, 2011.

(60) Provisional application No. 61/516,681, filed on Apr. 5, 2011.

(51) Int. Cl.
B60R 21/18 (2006.01)
(52) U.S. Cl. ........... 280/735; 280/733; 180/268; 701/45
(58) Field of Classification Search .................. 280/735, 280/733; 180/268; 701/45
See application file for complete search history.

(56) References Cited

U.S. PATENT DOCUMENTS

| | | | | |
|---|---|---|---|---|
| 3,766,612 A * | 10/1973 | Hattori | ................... | 200/61.58 B |
| 5,879,024 A * | 3/1999 | Estep | ............................ | 280/735 |
| 5,984,350 A * | 11/1999 | Hagan et al. | .................. | 280/735 |
| 6,002,325 A * | 12/1999 | Conaway | .................... | 340/384.1 |
| 6,239,695 B1 * | 5/2001 | Okada et al. | ............... | 340/457.1 |
| 6,449,545 B1 | 9/2002 | Nitschke et al. | | |
| 6,682,094 B1 * | 1/2004 | Laituri et al. | ................. | 280/735 |
| 7,224,270 B2 * | 5/2007 | Patterson et al. | .......... | 340/457.1 |
| 7,296,825 B1 * | 11/2007 | Zia et al. | .................... | 280/801.1 |
| 2002/0050826 A1 | 5/2002 | Boran et al. | | |
| 2007/0005202 A1 | 1/2007 | Breed | | |
| 2007/0055429 A1 | 3/2007 | Komaki et al. | | |
| 2007/0096447 A1 * | 5/2007 | Tabe | ............................. | 280/735 |
| 2012/0259484 A1 | 10/2012 | Shields et al. | | |
| 2012/0259586 A1 | 10/2012 | Shields et al. | | |

* cited by examiner

Primary Examiner — Drew Brown
(74) Attorney, Agent, or Firm — Perkins Coie LLP (57) ABSTRACT

Systems for indicating the status of a seatbelt buckle prior to a protective response are disclosed herein. An airbag activation system configured in accordance with one embodiment of the disclosure includes a normally closed magnetically operated reed switch. The reed switch is attached to a connector carried on one portion of a seatbelt, and a magnet is attached to a buckle carried on another portion of the seatbelt. Coupling the connector to the buckle causes the magnetic field of the magnet to move the reed switch from the normally closed position to an open position, thereby enabling the activation system to inflate the airbag in the event of an accident.

17 Claims, 5 Drawing Sheets

ACTIVATION SYSTEMS FOR INFLATABLE PERSONAL RESTRAINT SYSTEMS

CROSS-REFERENCE TO RELATED APPLICATIONS INCORPORATED BY REFERENCE

This application is a continuation-in-part of U.S. patent application Ser. No. 13/174,659, filed Jun. 30, 2011, and entitled "INFLATABLE PERSONAL RESTRAINT SYSTEMS," which claims the benefit of U.S. Provisional Application No. 61/516,681, filed Apr. 5, 2011, and entitled "AIRBAG SYSTEM WITH WIRELESS DIAGNOSTICS" which are hereby incorporated by reference in their entireties. The subject matter of the following U.S. patent applications and U.S. patents are incorporated into the present application in their entireties by reference: U.S. patent application Ser. No. 13/227,392, filed concurrently herewith, and entitled "BUCKLE CONNECTORS FOR INFLATABLE PERSONAL RESTRAINTS AND ASSOCIATED METHODS OF USE AND MANUFACTURE," U.S. patent application Ser. No. 13/170,079, filed Jun. 27, 2011, and entitled "SENSORS FOR DETECTING RAPID DECELERATION/ACCELERATION EVENTS;" U.S. patent application Ser. No. 13/086,134, filed Apr. 13, 2011, and entitled "STITCH PATTERNS FOR RESTRAINT-MOUNTED AIRBAGS AND ASSOCIATED SYSTEMS AND METHODS;" U.S. Pat. No. 5,984,350; and U.S. Pat. No. 6,442,807.

TECHNICAL FIELD

The following disclosure relates generally to inflatable personal restraint systems, and more specifically to systems for determining the status of an inflatable personal restraint system.

BACKGROUND

Various types of seat belt and airbag systems have been used to protect passengers in automobiles, aircraft and other vehicles. In automobiles, airbags typically deploy from the steering column, dashboard, side panel, and/or other fixed location. During a rapid deceleration event (e.g., a collision), a sensor detects the event and transmits a corresponding signal to an initiation device (e.g., a pyrotechnic device) on an airbag inflator. Initiation causes the inflator to release compressed gas into the airbag via a hose, thereby rapidly inflating the airbag. There are a number of different types of inflators known in the art. Some inflators contain compressed gas (e.g., air, nitrogen, helium, argon, etc.). Other inflators (e.g., gas generating devices) provide high pressure gas via chemical reaction of an energetic propellant.

Airbags can be deployed in a number of positions around the vehicle passenger or driver. Airbags positioned in the steering column, for example, can inflate in front of the driver to cushion his head and torso from forward impact. Airbags can also reduce the likelihood of whiplash.

Although airbags that deploy from stationary locations (e.g., a steering column) may be effective in automobiles, they may not be as effective in other types of vehicles having other seating arrangements. Seats in commercial passenger aircraft, for example, can be configured in a variety of layouts that provide different spacing between succeeding rows and adjacent seats. Moreover, such layouts may lack the availability of stationary structures upon which to mount airbags. Additionally, seatbacks in aircraft may rotate forward and downward during a crash or similar event, and thus may be unsuitable for airbag storage. As a result, airbags have been developed that deploy from seatbelts to accommodate occupants in aircraft and other vehicles. Such airbags can deploy from, for example, a lap belt and/or a shoulder belt to provide additional protection during a crash or other rapid deceleration event. Such airbag systems are described in detail in U.S. Pat. No. 5,984,350, which is owned by the assignee of the present application and is incorporated herein in its entirety by reference.

Seatbelt airbag systems generally utilize electronic activation systems and circuitry to facilitate or enhance their protective features. It is generally desirable in such systems to ensure that the airbag does not inadvertently inflate when it is not needed, such as when a person is not present in the associated seat. At the same time, of course, systems designed to prevent inadvertent inflation should not prevent inflation when the seat is occupied and inflation is desired. For these reasons, various types of airbag activation systems have been developed that include means for determining whether a seatbelt connector and corresponding buckle have been engaged (i.e., to determine the "buckle status"), and thereby determine whether or not the seat is occupied. One such system utilizes a "normally open" reed switch in cooperation with a magnet. In general, the reed switch is mounted to the connector on one portion of the seatbelt, and the magnet is mounted to the buckle on the other portion of the seat belt. When the connector and the buckle are joined together to buckle the seatbelt, the magnet closes the reed switch. Closing the reed switch closes a corresponding electrical circuit that enables power to be provided for airbag initiation in the event of a crash.

DETAILED DESCRIPTION

The following disclosure describes various embodiments of activation systems for use with airbags and other restraint systems, and associated methods of manufacture and use. Certain details are set forth in the following description and FIGS. 1-6B to provide a thorough understanding of various embodiments of the disclosure. Other details describing well-known structures and systems often associated with activation systems, reed switches, and airbag systems, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical, or at least generally similar, elements. To facilitate the discussion of any particular element, the most significant digit or digits of any reference number refer to the Figure in which that element is first introduced. Element 110, for example, is first introduced and discussed with reference to FIG. 1.

Figure 1:
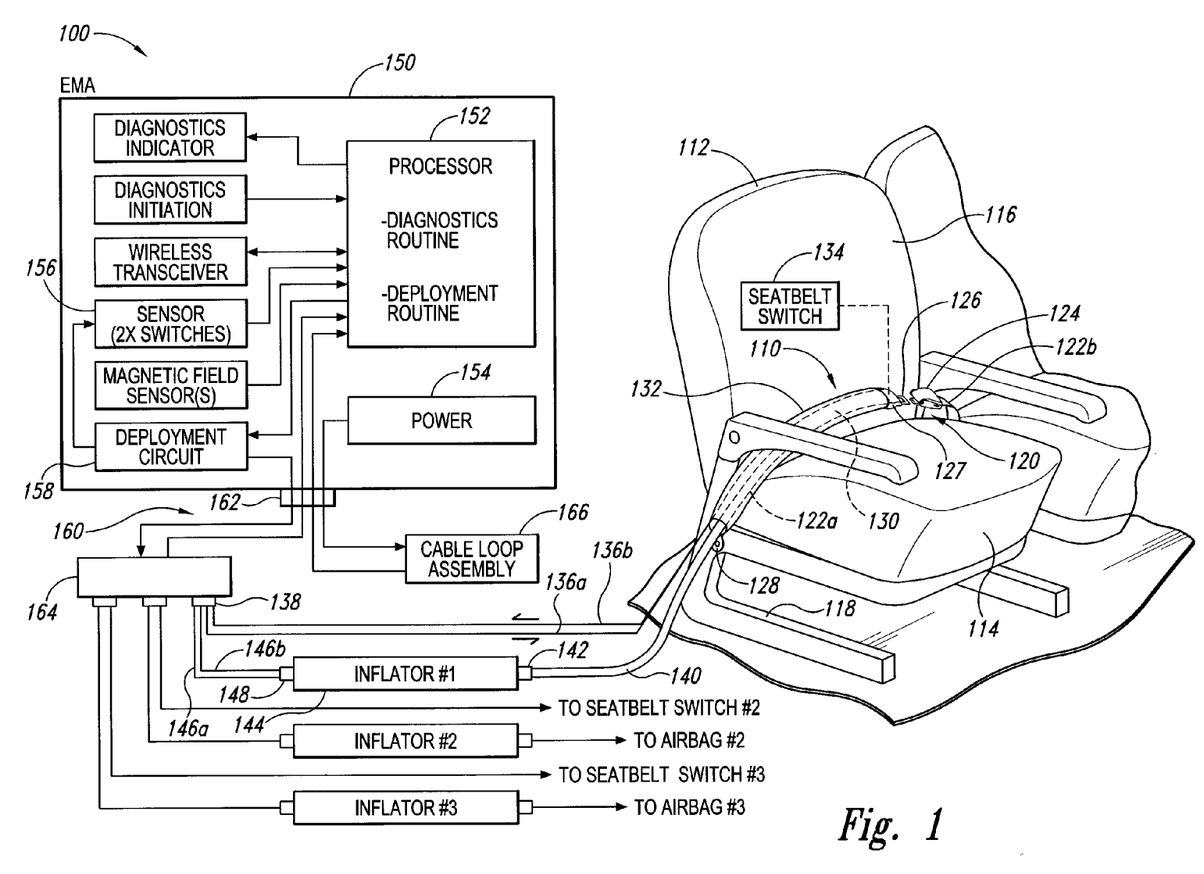
FIG. 1 is a partially schematic isometric view of an inflatable personal restraint system configured in accordance with an embodiment of the present disclosure.

FIG. 1 is a partially schematic isometric view of a seating area in a vehicle (e.g., an aircraft) having one or more seats 112 provided with an inflatable personal restraint system 100 ("restraint system 100") configured in accordance with an embodiment of the present technology. In one aspect of the illustrated embodiment, the seats 112 can be at least generally similar to conventional seats in, for example, a commercial aircraft. Accordingly, each of the seats 112 includes a back portion 116 extending upwardly from a seat portion 114, and each seat 112 is fixedly attached to the floor of the aircraft by a suitable mounting structure 118. Although certain embodiments of the present technology are described herein in the context of personal restraint systems for use in commercial aircraft, those of ordinary skill in the art will appreciate that the various structures and features of the personal restraint systems described herein can also be utilized in a wide variety of other vehicles, including other aircraft (e.g., private and military aircraft), ground vehicles (e.g., automobiles, trucks, buses, trains), water vehicles, etc.

In another aspect of the illustrated embodiment, the restraint system 100 includes an airbag assembly 110 carried on a seatbelt 120. More specifically, in the illustrated embodiment the seatbelt 120 includes a first web portion 122a and a corresponding second web portion 122b. A proximal end portion of the first web portion 122a can be fixably attached to the seat mounting structure 118 by means of a hook 128 or other suitable device known in the art. A proximal end portion of the second web portion 122b can be similarly attached to the mounting structure 118 on the opposite side of the seat 112. A distal end portion of the first web portion 122a can carry a first coupler, such as a connector assembly or connector 126 having a tongue portion. Similarly, a distal end portion of the second web portion 122b can carry a corresponding second coupler, such as a buckle assembly or buckle 124 configured to receive and releasably engage the tongue portion of the connector 126 to couple the two web portions 122a, 122b, together around a seat occupant (not shown) in a conventional manner. In certain embodiments, the connector 126 and the buckle 124 can be configured to operate in a manner that is at least generally similar to conventional connector/buckle assemblies found on conventional seatbelts. As described in greater detail below, in other embodiments the connector 126 and the buckle 124 can include features that preclude the connector 126 or the buckle 124 from being inadvertently joined to a different buckle or connector, respectively.

In a further aspect of the illustrated embodiment, the airbag assembly 110 includes an airbag 130 that is attached to the first web portion 122a generally proximate the connector 126. In one embodiment, for example, the airbag 130 can be fastened to the first web portion 122a using the methods and systems disclosed in U.S. patent application Ser. No. 13/086, 134, which was filed Apr. 13, 2011 and is incorporated herein in its entirety by reference. In FIG. 1, the airbag 130 is illustrated in the nondeployed configuration in which it is folded and neatly stowed beneath a flexible and durable cover 132. The cover 132 encloses the airbag 130 and the first web portion 122a and extends from a back shell 127 on the connector 126 to proximate the hook 128. The cover 132 includes one or more tear seams (not shown) which are designed to rupture upon airbag inflation enabling the airbag 130 to fully inflate.

In another aspect of the illustrated embodiment, the airbag assembly 110 further includes an inflator hose 140 having a first end portion in fluid communication with the interior of the airbag 130, and a second end portion that carries a coupling 142. The coupling 142 is configured to be operably (e.g., threadably) engaged with an outlet of an airbag inflator 144. Various types of inflators can be used with the airbag systems described herein. In certain embodiments, the inflator 144 can include a stored gas canister that contains compressed gas (e.g., compressed air, nitrogen, argon, helium, etc.) that can be released upon electrical initiation of a corresponding pyrotechnic device (e.g., a squib). Suitable inflators can be provided by, for example, Autoliv Inc. of Ogden Technical Center 3350 Airport Road Ogden, Utah, USA 84405. In other embodiments, other suitable inflator devices can be used without departing from the scope of the present disclosure. Such inflator devices can include, for example, gas generator devices that generate high pressure gas through a rapid chemical reaction of an energetic propellant. Accordingly, the present disclosure is not limited to a particular type of inflator device.

In yet another aspect of the illustrated embodiment, the airbag assembly 110 includes a seatbelt switch 134 carried on the web connector 126. As described in greater detail below, in one embodiment of the present disclosure the seatbelt switch 134 is a "normally closed" switch (e.g., a normally closed reed switch) that "opens" when the connector 126 is engaged with the buckle 124. The opening of the reed switch 134 can be effectuated by a magnet (not shown) carried on the buckle 124. When the connector 126 is properly engaged with the buckle 124, the reed switch 134 is moved into the field of the magnet, thereby causing the switch to open. When the reed switch 134 is closed (i.e., when the connector 126 is not engaged with the buckle 124), the reed switch 134 completes a circuit comprised of a first pair of wires including a first wire or lead 136a and a second wire or lead 136b. The first and second wires 136a, 136b terminate in an electrical connector 138. A second pair of wires 146a and 146b also terminates in the electrical connector 138. A distal end portion of the second pair of wires 146 carries an electrical connector 148 operably coupled to an initiation device (e.g., a squib or other ignitor; not shown) on the inflator 144.

In a further aspect of the illustrated embodiment, the airbag system 100 includes an electronic module assembly (EMA) 150 for controlling initiation and deployment of the airbag 130 during a rapid deceleration event (e.g., a crash) of sufficient magnitude. The EMA 150 is operably coupled to the airbag assembly 110 via a cable assembly 160. The cable assembly 160 includes a first connector 162 that is plugged in to the EMA 150 and a second connector 164 that provides a receptacle for the airbag electrical connector 138. In the illustrated embodiment, the EMA 150 includes a microprocessor 152 that receives electrical power from a power source 154 (e.g., one or more lithium batteries). Though shown schematically, the EMA 150 can include a protective housing that contains the various electronics, circuitry, and associated devices contained within. When employed in, for example, a commercial aircraft, the EMA 150 can be mounted to a rigid structure beneath the seat 112.

In another aspect of the illustrated embodiment, the EMA 150 includes a sensor 156 that detects rapid deceleration along a particular axis (e.g., an axis of forward motion of the vehicle). Moreover, in this embodiment the sensor 156 can include two individual sensor switches aligned with a common axis for additional safety as will be explained below. The sensor switches can be virtually any type of suitable switch known in the art for responding to a rapid deceleration (or acceleration) event, including magnetically activated reed switches and/or hall effect switches. In one embodiment, for example, the sensor switches can be at least generally similar in structure and function to the sensor switches in U.S. patent application Ser. No. 13/170,079, filed Jun. 27, 2011, and entitled, "SENSORS FOR DETECTING RAPID DECELERATION/ACCELERATION EVENTS," which is incorporated herein in its entirety by reference.

In operation, if the vehicle experiences a crash or other rapid deceleration event above a preset magnitude, the sensor switches in the sensor 156 close and complete their corresponding circuits. One of the sensor switches causes the microprocessor 152 to detect the occurrence of a crash event. Upon confirming that the connector 126 is operably engaged with the buckle 124 (e.g., by confirming that the seatbelt switch 134 is in the open position, as described further below), the microprocessor 152 sends a corresponding signal to a deployment circuit 158. Upon receiving a signal from the microprocessor 152, the deployment circuit 158 completes a circuit to the ignitor that causes the inflator to discharge its compressed gas into the airbag 130 via the hose 140 and inflate the airbag 130 to provide the seat occupant (not shown) with additional protection during the crash event.

The foregoing discussion provides a high level overview of some of the structures and functions of the airbag restraint system 100 in accordance with one embodiment of the present technology. Those of ordinary skill in the art will appreciate that various aspects and features of the various subsystems of the airbag system 100 described above can be utilized in combination with other systems without departing from the spirit or scope of the present disclosure. For example, in certain embodiments the airbag assembly 110 described above can be used with an EMA that, rather than including a microprocessor, can simply include a power source and a crash sensor that completes a circuit to activate an inflator during a crash event. Moreover, those of ordinary skill in the art will appreciate that the EMA 150 of the illustrated embodiment includes a number of other components and features for, e.g., diagnostics, redundancy, etc., which have not been described herein to avoid unnecessarily obscuring the general description of various embodiments of the present technology.

Moreover, those of ordinary skill in the art will appreciate that additional airbag assemblies 110 (e.g., a second and third airbag assembly) can be operably coupled to the EMA 150 for use with the other seats in the row adjacent to the seat 112. Accordingly, in one embodiment, if a row of seats in an aircraft includes three seats, each seat could be outfitted with a seatbelt airbag assembly as described above, with each of the airbag assemblies coupled to an individual inflator as illustrated in FIG. 1. All three of the airbag assemblies, however, can be initiated by the single EMA 150.

Figure 2:
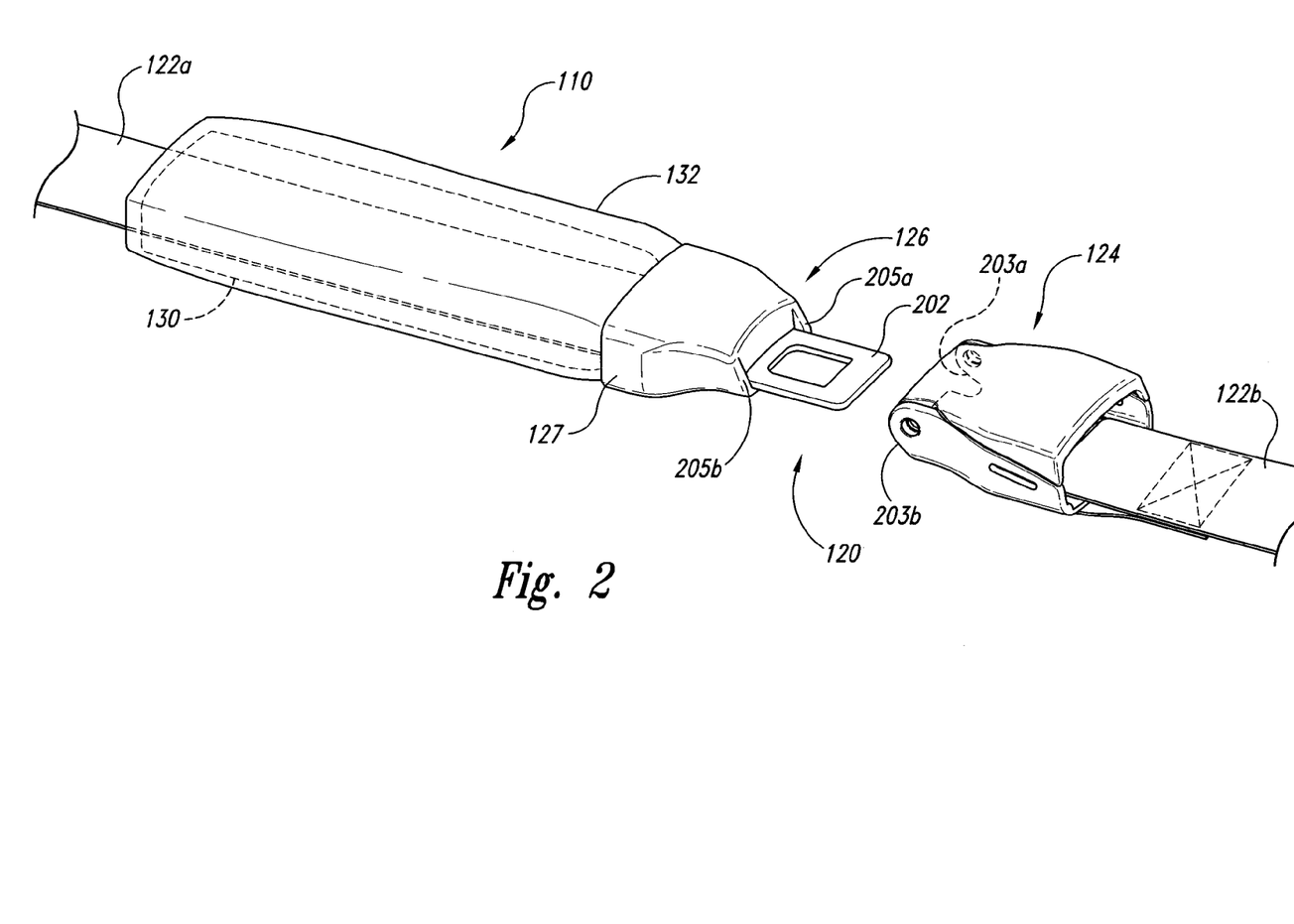
FIG. 2 is an isometric view of a seatbelt having an inflatable airbag, configured in accordance with an embodiment of the present disclosure.

FIG. 2 is an isometric view of the seatbelt 120 configured in accordance with an embodiment of the present disclosure. As discussed above, the cover 132 extends from beneath the back shell 127 and encloses the airbag 130 and a length of the first web portion 122a. The connector 126 is attached to a distal end portion of the first web portion 122a, and the buckle 124 is attached to a distal end portion of the opposing second web portion 122b. A tongue portion 202 of the connector 126 is configured to be releasably engaged with the buckle 124 in a conventional manner.

As previously mentioned, multiple airbag assemblies 110 can be installed in a row of seats in an aircraft. In other embodiments, however, an airbag assembly 110 may be installed in a seat adjacent to another seat having a conventional seat belt without an airbag. In such an embodiment, it is desirable to ensure that the connector 126 and the buckle 124 can only be engaged with each other, and not with a buckle or a connector of another seatbelt. In the illustrated embodiment, the connector 126 and the buckle 124 are "keyed" to prevent either the connector 124 or the buckle 126 from being engaged with an unintended connector or buckle that is not keyed. For example, the connector backshell 127 includes a first back sloped or angled edge 205a and a second back sloped edge 205b. The buckle 124 includes a complimentary first forward sloped edge 203a and a complimentary second forward sloped edge 203b. The back sloped edges 205 and the forward sloped edges 203 are shaped to allow the tongue portion 202 to be fully inserted into the buckle 124. A seatbelt connector having vertical edges, or edges with other shapes, in place of the forward sloped edges 203 would prevent the full insertion of the corresponding tongue portion into the buckle 124. Similarly, a seatbelt buckle having vertical edges in place of the back sloped edges 205 would prevent the full insertion of the tongue portion 202 into the buckle. Accordingly, the keyed connector 126 and the keyed buckle 124 prevent inadvertent engagement of either the buckle 124 or the connector 126 with a non-keyed buckle or connectors.

Although the illustrated embodiment is keyed with the forward sloped edges 203 and the back sloped edges 205, other embodiments may include other features for preventing inadvertent engagement with foreign buckles or connectors. Raised portions on the tongue portion 202, for example, may engage a groove on the buckle 124. In another embodiment, an offset edge on the connector 126 can be engaged with a corresponding slot on the buckle 124. The offset edge and the corresponding slot can be configured in accordance with the systems and methods of U.S. Pat. No. 6,442,807, filed Mar. 13, 2000, and entitled, "AIRBAG BUCKLE ASSEMBLY," which is incorporated herein in its entirety by reference. Accordingly, other embodiments in accordance with the present disclosure may include keyed features that have differing shapes and/or sizes.

Figure 3:
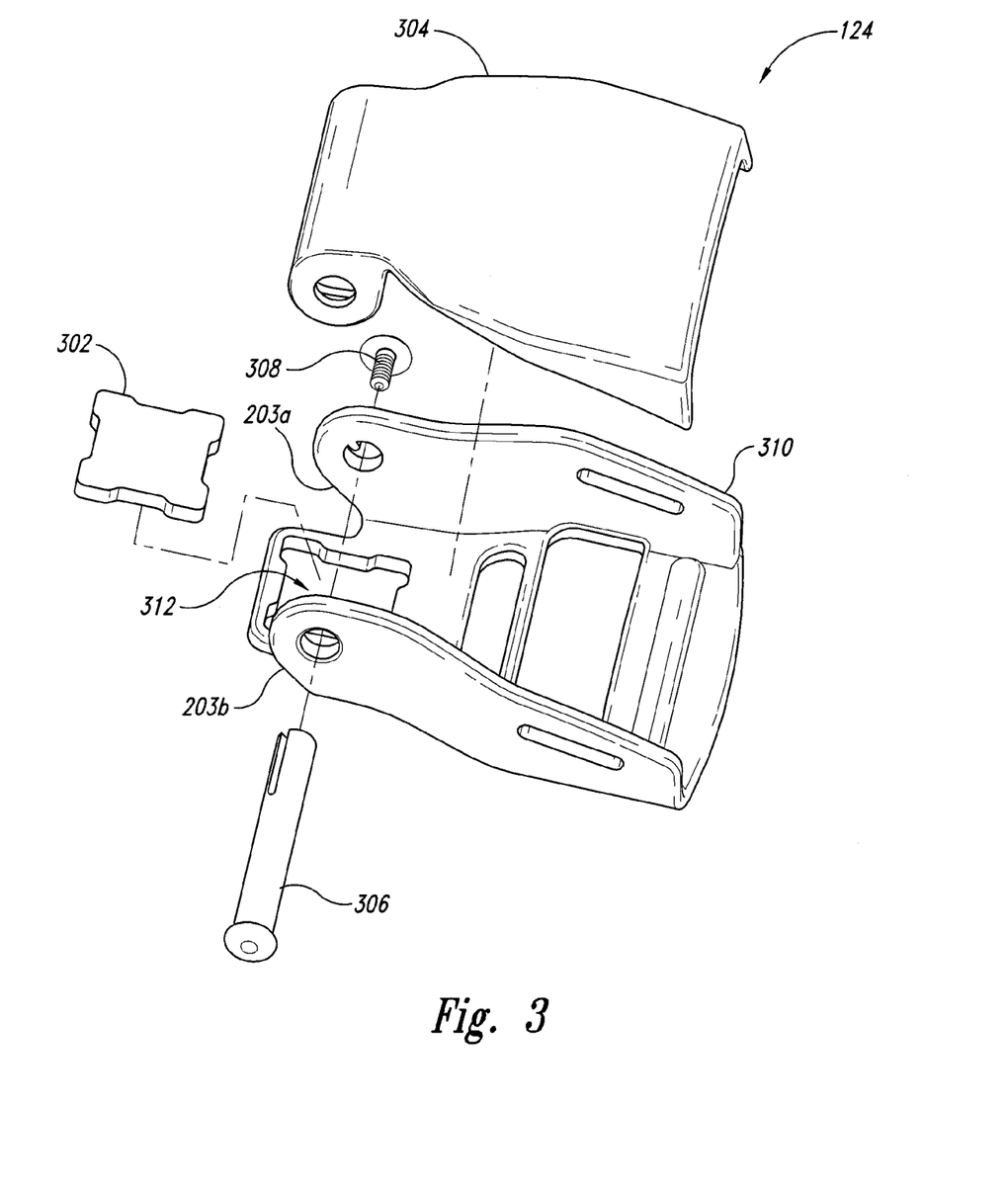
FIG. 3 is an exploded isometric view of a portion of a buckle configured in accordance with an embodiment of the present disclosure.

FIG. 3 is an exploded isometric view of a portion of the buckle 124 configured in accordance with an embodiment of the present disclosure. In the illustrated embodiment, a buckle base 310 includes an aperture 312 configured to fixedly receive a magnet 302. A release lever 304 is pivotably coupled to the buckle base 310 with a pin 306 and a corresponding fastener 308. Other features and components common to buckles and well understood by those of ordinary skill in the art are not shown in FIG. 3 to avoid unnecessarily obscuring the features of the present disclosure. However, the buckle 124 can function at least generally similarly to conventional buckle and connector systems for buckling and releasing seatbelts. For example, the connector 126 can be engaged with the buckle 124 by inserting the tongue portion 202 into the buckle 124. Conversely, the connector 126 can be released from the buckle 124 by rotating the lever 304 away from the base 310 and withdrawing the tongue portion 202 from the buckle 124. However, as discussed above, the illustrated embodiment includes the back sloped edges 205 that ensure only a keyed connector 126 can be fully inserted into the buckle 124.

Figure 4:
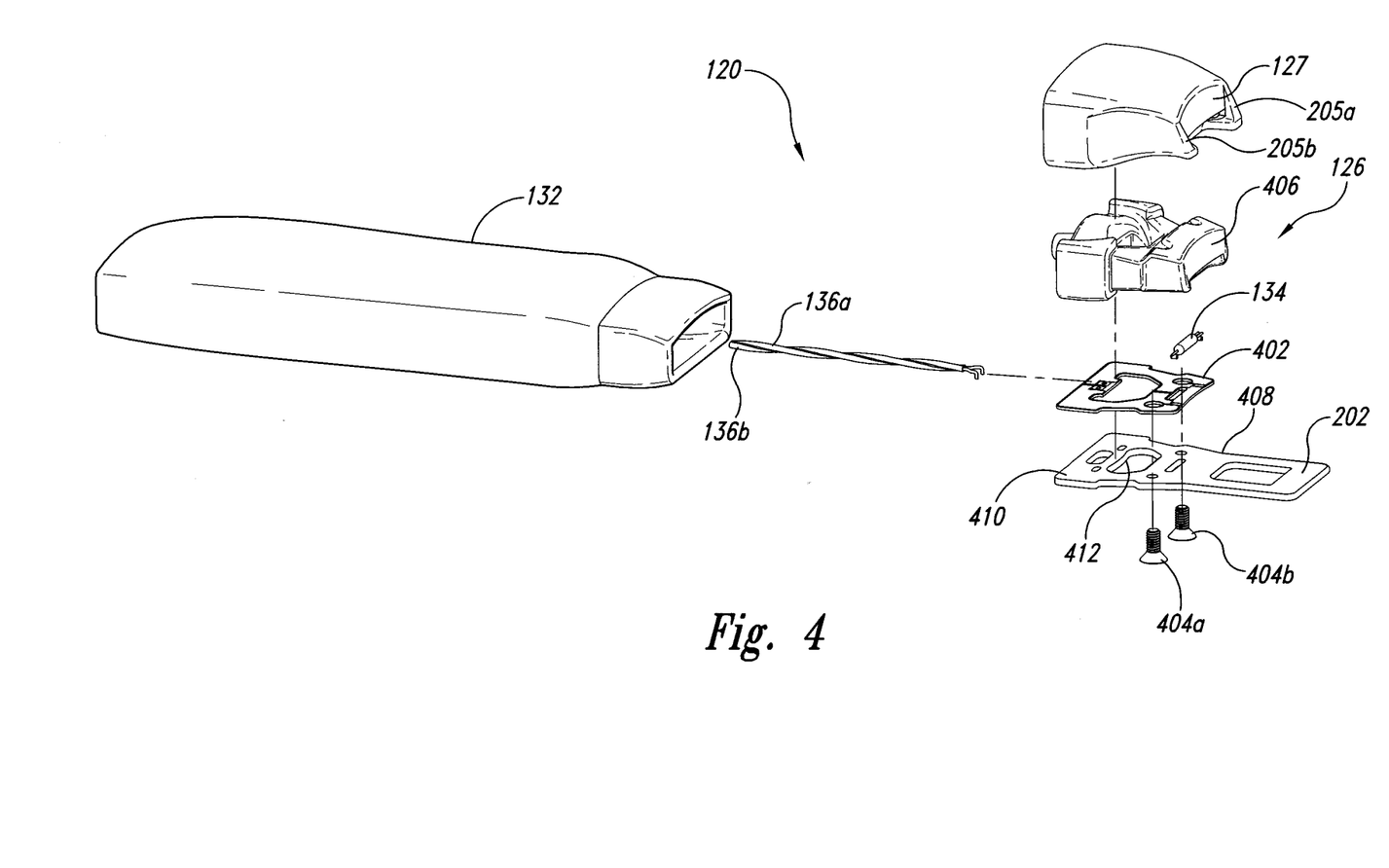
FIG. 4 is a partially exploded isometric view of a portion of a seatbelt configured in accordance with an embodiment of the present disclosure.

FIG. 4 is a partially exploded isometric view of a portion of the seatbelt 120 configured in accordance with an embodiment of the present disclosure. In the illustrated embodiment, the tongue portion 202 is part of a base plate 408 having aft portion 410 with an aperture 412. The distal end of the first web portion 122a (not shown) passes through the aperture 412 to attach the first web portion 122a to the base plate 408. In the illustrated embodiment, a first fastener 404a and a second fastener 404b fixedly attach the base plate 408 to a housing 406, with a circuit card 402 sandwiched therebetween. The seatbelt switch 134 is operably coupled to the circuit card 402 beneath the housing 406, as discussed further below. The wires 136 are also operably coupled to the circuit card 402 and extend through an opening in the housing 406 and then under the cover 132. The back shell 127 encloses the housing 406.

In one embodiment, the components and features of the connector 126 can be at least generally similar in structure and function to the corresponding components and features disclosed in U.S. patent application Ser. No. 13/227,392, entitled "BUCKLE CONNECTORS FOR INFLATABLE PERSONAL RESTRAINTS AND ASSOCIATED METHODS OF USE AND MANUFACTURE," which was filed concurrently herewith, and the entirety of which is incorporated by reference herein.

Figure 5:
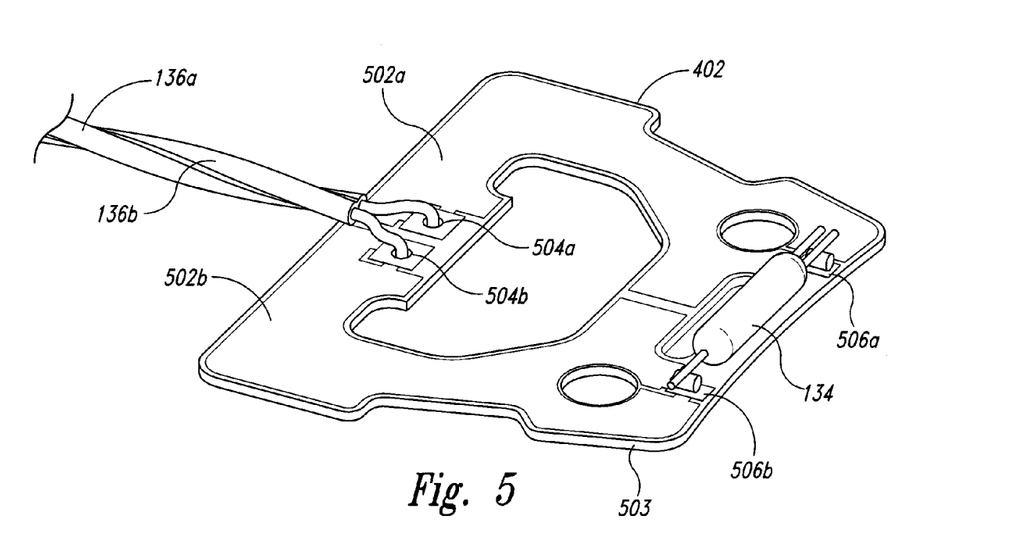
FIG. 5 is an isometric view of a circuit card and a seatbelt switch configured in accordance with an embodiment of the present disclosure.

FIG. 5 is an isometric view of the circuit card 402 and the seatbelt switch 134 configured in accordance with an embodiment of the present disclosure. In the illustrated embodiment, the circuit card 402 includes a first conductive layer 502a and a second conductive layer 502b. The conductive layers 502 are fixedly attached to a nonconductive base layer 503 and extend from a first wire connection 504a and a second wire connection 504b to a first seatbelt switch connection 506a and a second seatbelt switch connection 506b, respectively. The conductive layers 502 form isolated electrical paths between their respective wire connections 504 and seatbelt switch connections 506. The wires 136 can be operably coupled to the wire connections 504 with solder or other suitable coupling means to provide an electrical connection. Similarly, the seatbelt switch 134 can be operably coupled to the seatbelt switch connections 506 with solder or other suitable coupling means to provide an electrical connection. As a result, a closed electrical circuit is provided from the wires 136 through the seatbelt switch 134 when the switch is closed.

Figure 6A:
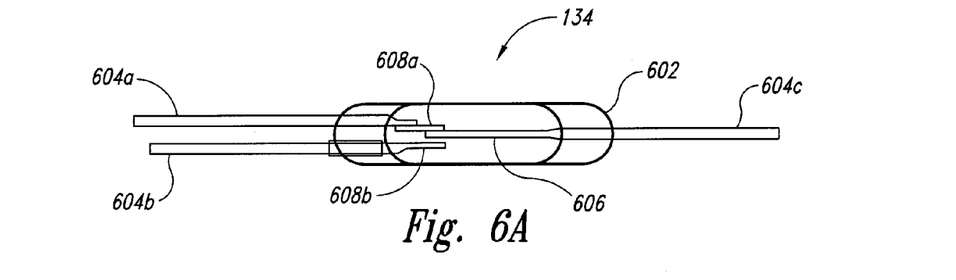
FIG. 6A is a cutaway view of a normally closed seatbelt switch in a closed position.
Figure 6B:
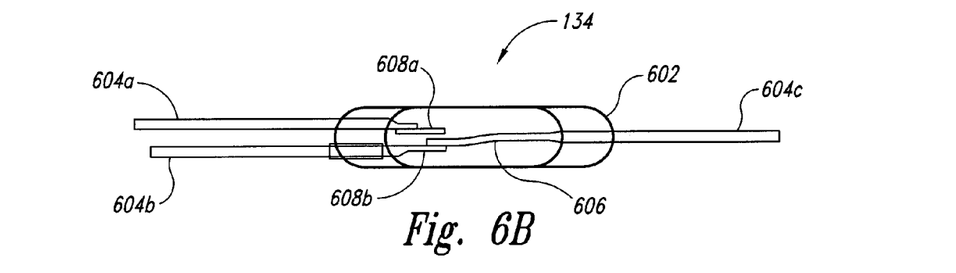
FIG. 6B is a cutaway view of the normally closed seatbelt switch in an open position.

FIG. 6A is a cutaway view of the seatbelt switch 134 in the "normally closed" position, and FIG. 6B is a cutaway view of the seatbelt switch 134 in an open position. Referring to FIGS. 6A and 6B together, the seatbelt switch 134 is contained in a hermetically sealed vessel 602 (e.g., a hermetically sealed glass vessel). A first lead 604a and a second lead 604b extend into the hermetically sealed vessel 602 from one end and terminate in contacts 608a and 608b, respectively. A third lead 604c extends into the vessel 602 from the opposite end and terminates in a metal reed 606. The first lead 604a and the third lead 604c are operably connected to the switch connections 506a and 506b, respectively, as described above in reference to FIG. 5. The second lead 604b is an open circuit.

Referring to FIGS. 2 through 6B together, in operation, the connector 126 is operably inserted into the buckle 124 to buckle the seatbelt 120. When the seatbelt 120 is buckled, the seatbelt switch 134 is positioned sufficiently close to the magnet 302 to expose the seatbelt switch 134 to the magnetic field of the magnet 302. The magnetic field urges the metal reed 606 away from the contact 608a and into contact with the contact 608b, as shown in FIG. 6B, thereby moving the seatbelt switch 134 from the normally closed position to an open position. As described above, in the event of a crash, the microprocessor 152 determines whether the seatbelt 120 is buckled by determining that there is an open circuit with the seatbelt switch 134. Accordingly, in the event of a crash, the seatbelt switch 134 provides an indication that the seatbelt 120 is buckled (i.e., the switch is open), and the microprocessor 152 sends a corresponding signal to the deployment circuit 158 to cause inflation of the airbag 130.

A failure of the wiring or the connections between the seatbelt switch 134 and the EMA 150 would likely result in an open circuit. One advantage of some embodiments of the present disclosure is that in the event of a detected crash during such a failure, the EMA 150 would determine that the circuit was open and would still initiate deployment of the airbag 130. Hence, the present design allows for deployment of the airbag 130, even with a wiring or connector failure in the seatbelt switch circuit.

Another advantage of some embodiments of the present disclosure is the ability to test the electrical circuitry of the personal restraint system 100 without having to first buckle the seatbelt 120. This is possible because the normally closed switch 134 enables the processor 152 to check the circuit through the seatbelt switch 134 while the seatbelt 120 is unbuckled. If the circuit is open, it is likely an indication of a fault in the seatbelt switch 134 or the wires 136. If the circuit is closed, it is indicative of the functionality of the seatbelt switch 134 and the wires 136. Decreasing the time required for testing decreases maintenance costs for the system. In contrast, the seatbelt must first be buckled to check the seatbelt switch and associated wiring in other airbag systems having normally open switches. This requires a technician to buckle the seatbelts prior to the testing procedure, which can be very time consuming on an aircraft with a large number of seats.

From the foregoing it will be appreciated that specific embodiments have been described herein for purposes of illustration, but that various modifications may be made without deviating from the spirit and scope of the various embodiments of the disclosure. Hence, although the illustrated embodiment includes a magnetically operated reed switch 134, it is within the scope of the present disclosure to include other types of switches, including other types of magnetically operated switches, such as a Hall effect sensor. As is known in the art, a Hall effect sensor varies its output voltage in response to a change in the magnetic field, and can therefore operate as a switch. In such an embodiment, the operation would be substantially similar to the above described embodiments. However, rather than checking for an open circuit, the processor 152 would verify that the output voltage of the Hall effect switch was not equal to a value that occurs when the magnet 302 is proximate the Hall effect switch.

Additionally, a non-magnetically activated switch, such as a spring loaded toggle switch or a button switch, may be used. In one such embodiment, the toggle switch can be moved from a normally closed position to an open position by a mechanical interface with the buckle 124. For example, the toggle switch could be mounted at a position on the connector 126 such that when the tongue portion 202 of the connector 126 is inserted into the buckle 124, a portion of the buckle 124 moves the toggle switch from a closed position to an open position. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

I claim:

1. A system for providing an indication that a seatbelt carrying an airbag is fastened, the system comprising:
   a connector carried on a first web portion of the seatbelt;
   a buckle carried on a second web portion of the seatbelt;
   a normally closed magnetically operable switch fixedly attached to the connector; and
   a magnet fixedly attached to the buckle, wherein the buckle is configured to releasably engage the connector to fasten the seatbelt, and wherein when the buckle is releasably engaged with the connector the magnet moves the normally closed switch from the normally closed position to an open position.

2. The system of claim 1 wherein the seatbelt is associated with a passenger seat on an aircraft and the system further comprises:
   an inflator configured to inflate the airbag;
   a sensor configured to detect a crash event; and
   a processor operably connected to the sensor, the inflator, and the normally closed switch, wherein upon detection of a crash event the processor determines that the normally closed switch is open prior to sending a signal to the inflator to inflate the airbag.

3. The system of claim 1 wherein the connector further comprises a housing which supports an airbag cover, and wherein the normally closed switch is contained within the housing.

4. The system of claim 1, further comprising:
   a microprocessor;
   a first electrical circuit operably connecting the microprocessor to the normally closed switch; and
   a second electrical circuit operably connecting the microprocessor to an airbag initiation circuit, wherein the microprocessor confirms that the first electrical circuit is an open circuit before sending a signal to the airbag initiation circuit via the second electrical circuit.

5. The system of claim 4 wherein the microprocessor controls multiple airbags.

6. A system for indicating the status of a seatbelt, the system comprising:
   a switch fixedly attached at least proximate to a first coupler, wherein the first coupler is coupled to a first end portion of a first web, wherein the switch is operable between a normally closed position in which it completes an electrical circuit and an open position, and wherein the switch is magnetically moveable from the normally closed position to the open position; and
   a second coupler coupled to a second end portion of a second web, wherein the first coupler can be releasably engaged with the second coupler to join the first web to the second web, and wherein the switch is configured to move from the normally closed position to the open position when the first coupler is engaged with the second coupler.

7. The system of claim 6 wherein the first coupler is a connector and the second coupler is a buckle.

8. The system of claim 6 wherein the first coupler is a buckle and the second coupler is a connector.

9. The system of claim 6 wherein the magnetically operated switch includes a reed switch.

10. The system of claim 6 wherein the magnetically operated switch includes a Hall effect sensor.

11. The system of claim 6, further comprising a magnet fixedly attached to the second coupler.

12. The system of claim 6, further comprising an electrical circuit operably connecting the switch to an electronic module assembly for inflating an airbag in response to an accident event, wherein when the switch is in the open position, the electrical circuit provides an indication to the electronic module assembly that the seatbelt is properly buckled.

13. The system of claim 12 wherein the electronic module assembly is configured to not inflate the airbag in response to the accident event when the switch is in the closed position.

14. The system of claim 6, further comprising means for determining that the electrical circuit is open.

15. The system of claim 6 wherein the first coupler includes a base plate and a circuit card fixedly attached to the base plate, and wherein the switch is operably attached to the circuit card.

16. A method for inflating a seatbelt airbag, the method comprising:
   providing an electrical circuit including a normally closed switch fixedly attached to one of a seatbelt connector and a seatbelt buckle;
   opening the normally closed switch in response to releasable engagement of the connector to the buckle and response to a magnetic field;
   receiving a signal from a sensor indicating a rapid deceleration event;
   determining if the electrical circuit is open; and
   when the electrical circuit is open, initiating inflation of the airbag.

17. The method of claim 16 wherein opening the normally closed switch includes moving a reed from a first position to a second position.

* * * * *

UNITED STATES PATENT AND TRADEMARK OFFICE
CERTIFICATE OF CORRECTION

PATENT NO. : 8,403,361 B2  
APPLICATION NO. : 13/227382  
DATED : March 26, 2013  
INVENTOR(S) : Ronald A. Shields Page 1 of 1

It is certified that error appears in the above-identified patent and that said Letters Patent is hereby corrected as shown below:

In the Specification:

In column 1, line 18, delete "13/227/392," and insert -- 13/227,392, --, therefor.

In the Claims:

In column 10, line 39, in claim 16, after "and" insert -- in --.

Signed and Sealed this  
Sixth Day of August, 2013

Teresa Stanek Rea  
*Acting Director of the United States Patent and Trademark Office*